(No Model.) 2 Sheets—Sheet 1.
A. G. FROTHINGHAM.
BELT.
No. 594,201. Patented Nov. 23, 1897.
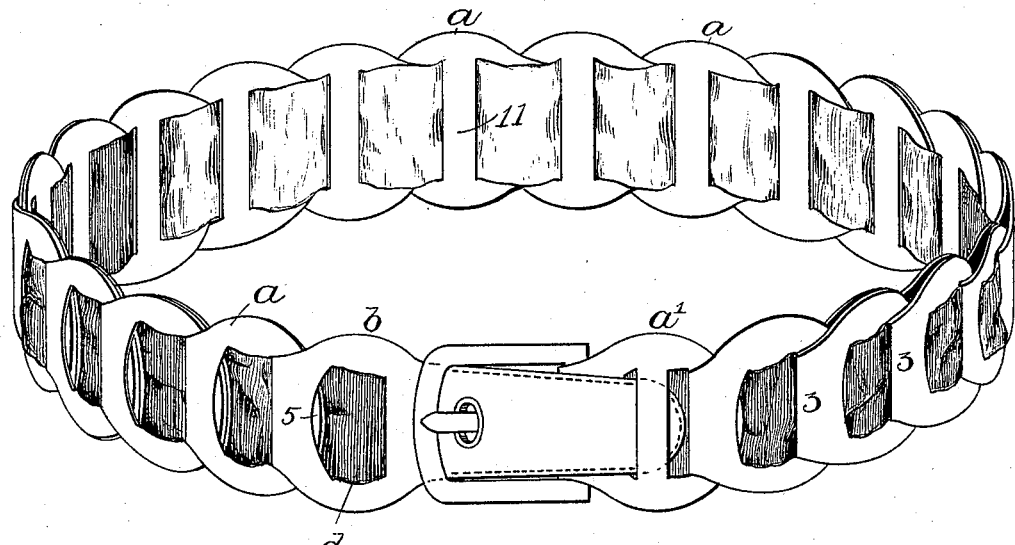
FIG. 1.
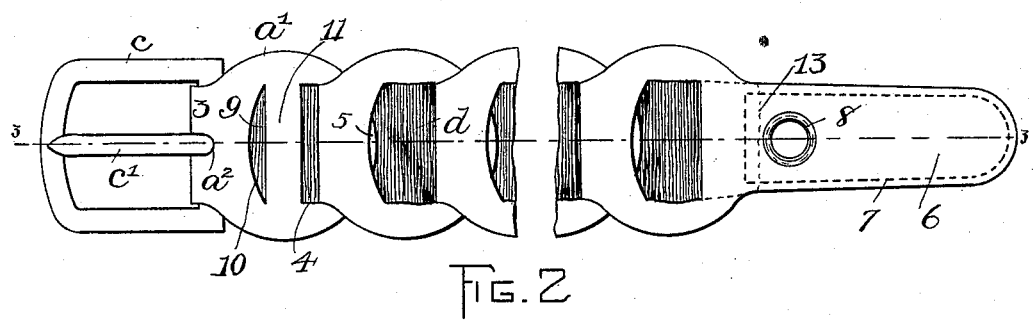
FIG. 2.
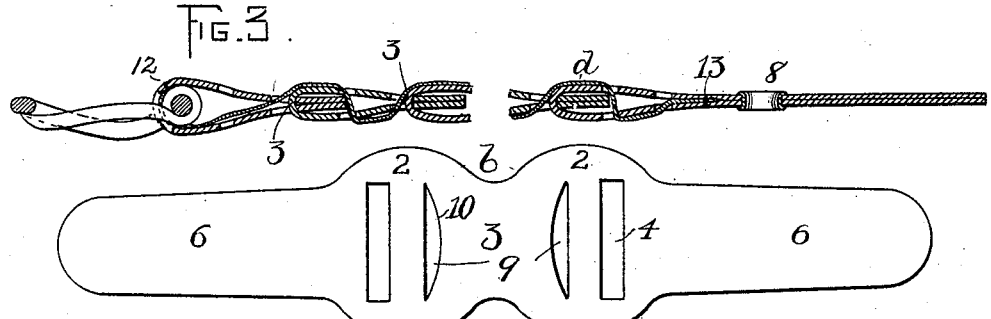
FIG. 3.
FIG. 4.
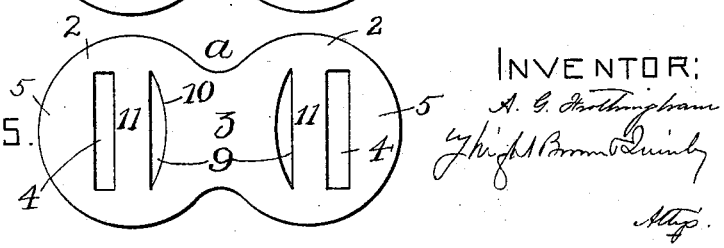
FIG. 5.
WITNESSES:
A. D. Harrison
P. W. Pezzetti
INVENTOR:
A. G. Frothingham
Wright Brown & Quinby
Attys.
THE NORRIS PETERS CO., PHOTO-LITHO., WASHINGTON, D. C.

(No Model.) 2 Sheets—Sheet 2.

A. G. FROTHINGHAM.
BELT.

No. 594,201. Patented Nov. 23, 1897.

WITNESSES:
A. D. Harrison.
P. W. Pezzetti.

INVENTOR:
A. G. Frothingham
by Knight Brown & Quimby
Attys.

UNITED STATES PATENT OFFICE.

ARTHUR G. FROTHINGHAM, OF SALEM, MASSACHUSETTS.

BELT.

SPECIFICATION forming part of Letters Patent No. 594,201, dated November 23, 1897.

Application filed February 16, 1897. Serial No. 623,688. (No model.)

*To all whom it may concern:*

Be it known that I, ARTHUR G. FROTHINGHAM, of Salem, in the county of Essex and State of Massachusetts, have invented certain new and useful Improvements in Belts, of which the following is a specification.

This invention has relation to belts of the class worn by women as articles of apparel, and has for its object to provide, as a new article of manufacture, a belt of the character specified which shall be capable of long use and highly ornamental, so as to appeal to the æsthetic tastes.

To this end the invention consists of a belt formed of a series of links assembled together and provided at its ends with fastening devices, such as a perforated strap and a buckle and a strip of flexible material interwoven through the links. Preferably the links are died or stamped out of leather, each link being provided with an aperture to receive the preceding link and permit the said link to be doubled over the parallel end bars, so as to form a chain. The flexible strip, which may be a ribbon of any color, either plain or figured, is interwoven through the links, so that the belt presents a handsome appearance to the eye.

Reference is to be had to the accompanying drawings, and to the letters and figures marked thereon, forming a part of this specification, the same letters and figures designating the same parts or features, as the case may be, wherever they occur.

Figure 6:
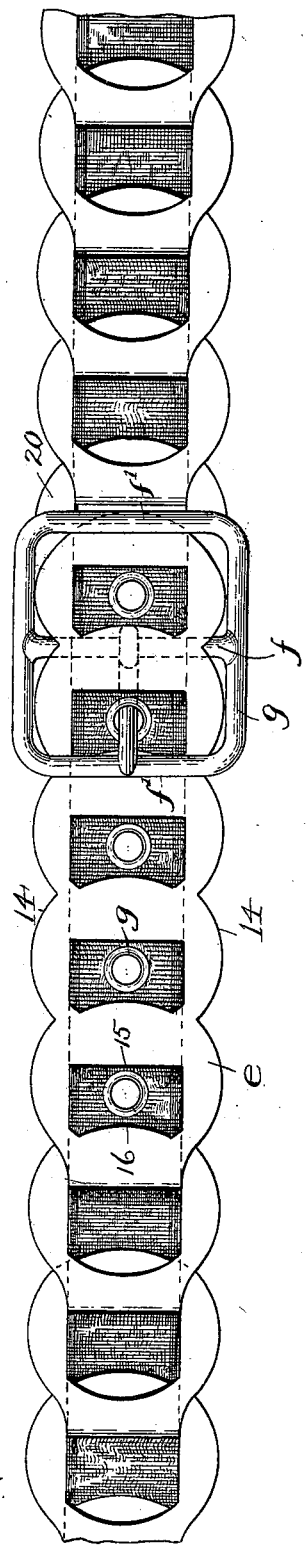
Figure 7:
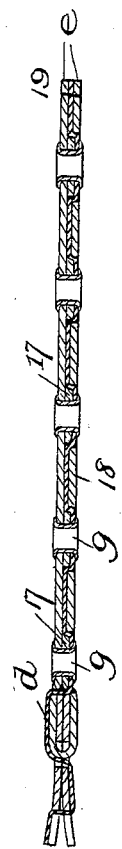

Of the drawings, Figure 1 is a perspective view illustrating a belt embodying my invention. Fig. 2 illustrates the same straightened out, the main portion of the belt between the ends being broken away. Fig. 3 is a longitudinal sectional view on the line 3 3 of Fig. 2. Fig. 4 shows in detail one of the end links of the belt. Fig. 5 shows one of the intermediate links. Fig. 6. illustrates another way of forming the end of the belt which engages the buckle. Fig. 7 is a central longitudinal section through the end of the belt when constructed as illustrated in Fig. 6.

In carrying out the invention I employ, as previously stated, a series of assembled links $a\ a$, stamped or died out of such material as leather of the desired flexibility. Each of the links, with the exception of that at $b$ which is located at one of the ends, is of the form shown in Fig. 5—that is to say, each link when flattened out presents the appearance of two circular disks 2 2, joined together at 3, so that when it is doubled over it has the appearance of a single circular disk. The links each have slots 4 4 of a length substantially equal to the width of the bridge or connecting portion 3, so that when the link is doubled over and another link is passed through the slots 4 4 the doubled portion 3 engages the end bars 5 5 thus formed. Thus by connecting the links together in this way a belt or chain is formed which has the appearance of a number of circular disks connected together, as shown in Figs. 1 and 2.

The end link $a'$, as shown in Fig. 1, is doubled over the end bar of a buckle $c$, and the tongue $c'$ is passed through an aperture $a^2$ in the doubled portion 3. The link $b$ at the opposite end, however, is formed with elongations 6 6, which, when the belt is finally assembled, are sewed together by a line of stitches 7, as shown in Figs. 1 and 2, to form a strap to coact with the buckle $c$. An eyelet 8 is secured in the strap, there being as many of them as is desired.

In forming the chain the link $a'$ is first doubled over the end bar of the buckle and the subsequent links are passed through the slots 4 4 of the preceding links until the link $b$ is put in place, after which the strips 6 6 are sewed together by a line of stitches 7. Each link is also formed with a slot 9, one edge 10 of which is curved, so as to form the cross-bars $l$. Then a ribbon $d$ or other ornamental flexible strap of material having one end secured by a line of stitches 12 underneath the doubled portion of the link $a'$ is interwoven through the links. It is passed under the doubled portion 3 and the end bars 5 of two adjacent links, then through the slots 9, over the cross-bars 11, and then under the doubled portions 3 and the end bars 5, and so on until its other end is secured by a line of stitches 13 between the extensions of the last link $b$.

From the foregoing it will be seen that I have provided a belt having a handsome appearance and which is peculiarly simple and easy to manufacture. The ribbon may be of any desired quality and may be plain or variegated to suit the taste of the wearer. The links may be formed of various colors and of various qualities of leather.

Of course it will be understood that I do not limit myself to the employment of a buckle such as shown, for I may secure the ends of the belt together by a clasp of any desired pattern and which may also be ornamental. For instance, in Figs. 6 and 7 I have illustrated the belt as being provided with an end link formed or fashioned in such way that the belt may be lengthened or shortened to suit a person of any size. In this event a link $e$ is employed which has its edges 14 scalloped to simulate a series of assembled links and which is doubled upon itself, as shown in Fig. 7. The front half of the link is formed with transverse slits 15 and 16, the former of which are straight and the latter of which are curved, as shown, so that when the ribbon $d$ is threaded through the slits over the cross-bars 17 between the slits and under the alternate portions 18 the strap presents the same general appearance as the remainder of the belt. The ribbon under the cross-bars 17 lies between the two halves of the strap, so that it is not exposed to wear when buckling the ends of the belt together, its end being secured by a line of stitches 19. The last link 20 on the other end of the belt is doubled about the central cross-bar $f$ of a three-bar buckle $g$, which is wider than the links, so that the free end of the belt can be passed under both end cross-bars $f'$, while the tongue passes through one of a series of eyelets $g$, secured in the end of the belt through the cross-bars 17 of the links.

By passing the eyelets through two thicknesses of leather they are less liable to be torn out, and being arranged, as shown, in the center of the space occupied by the ribbon they present a pleasing appearance.

I claim—

1. As a new article of manufacture, a belt comprising a series of assembled leather links, each link being doubled over the end bars of a preceding link, and having a cross-bar, a ribbon interwoven through said links and passing over said cross-bars and under the end bars, and means for attaching the ends of the belt together.

2. As a new article of manufacture, a belt comprising a series of doubled leather links each having a central cross-bar, a ribbon interwoven through said links and passing over the cross-bars and under the remainder of the links, a buckle on one end of the belt, and a strip on the other end of the belt having its edges scalloped, and provided with a series of eyelets.

In testimony whereof I have signed my name to this specification, in the presence of two subscribing witnesses, this 15th day of January, A. D. 1897.

ARTHUR G. FROTHINGHAM.

Witnesses:
A. D. HARRISON,
P. W. PEZZETTI.